Nov. 29, 1938. W. B. BRONANDER 2,137,998
DRIVING MECHANISM
Filed April 17, 1936 2 Sheets-Sheet 2
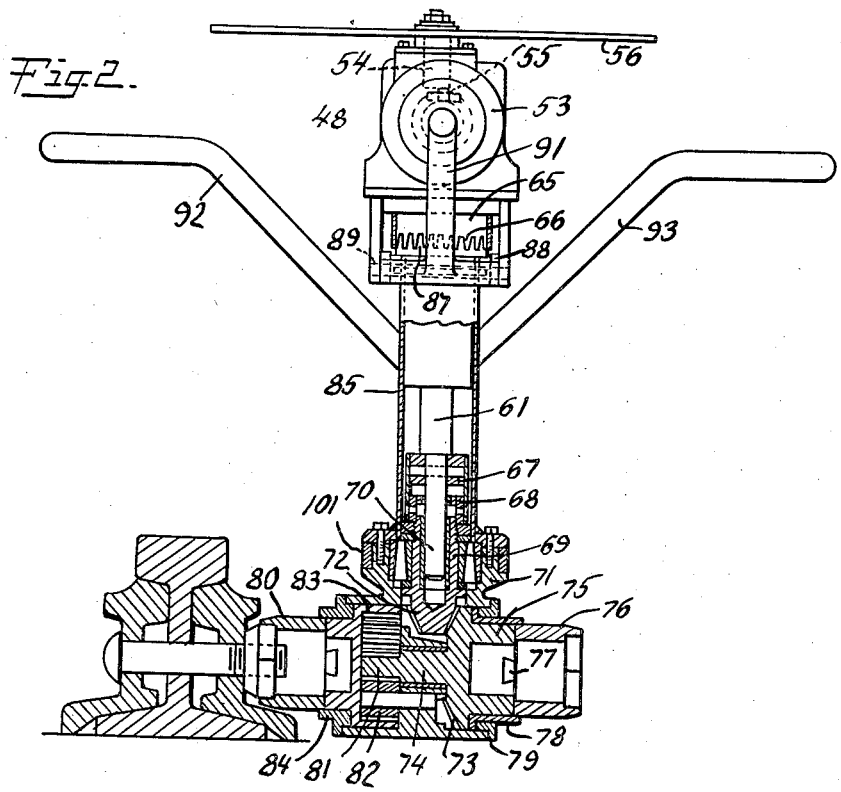
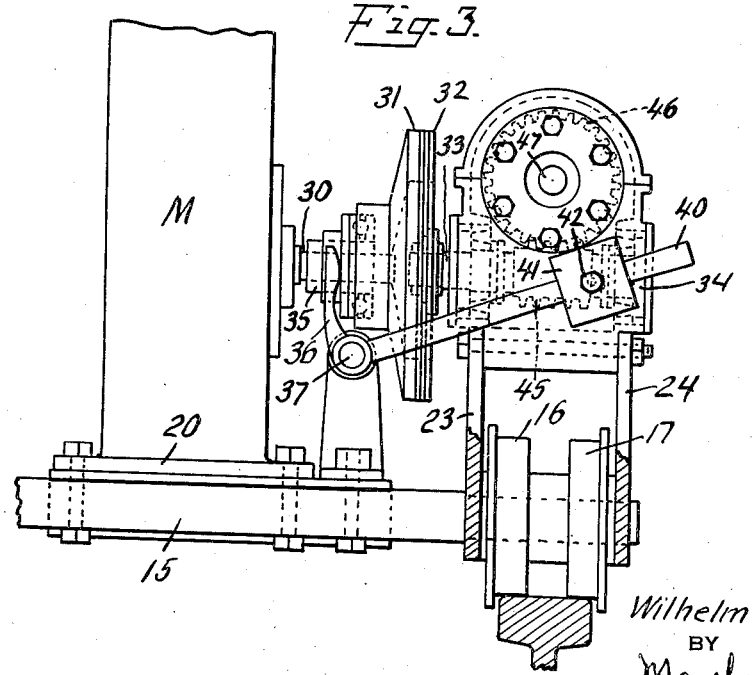
INVENTOR
Wilhelm B. Bronander
BY
Marshall & Hawley
ATTORNEYS Patented Nov. 29, 1938

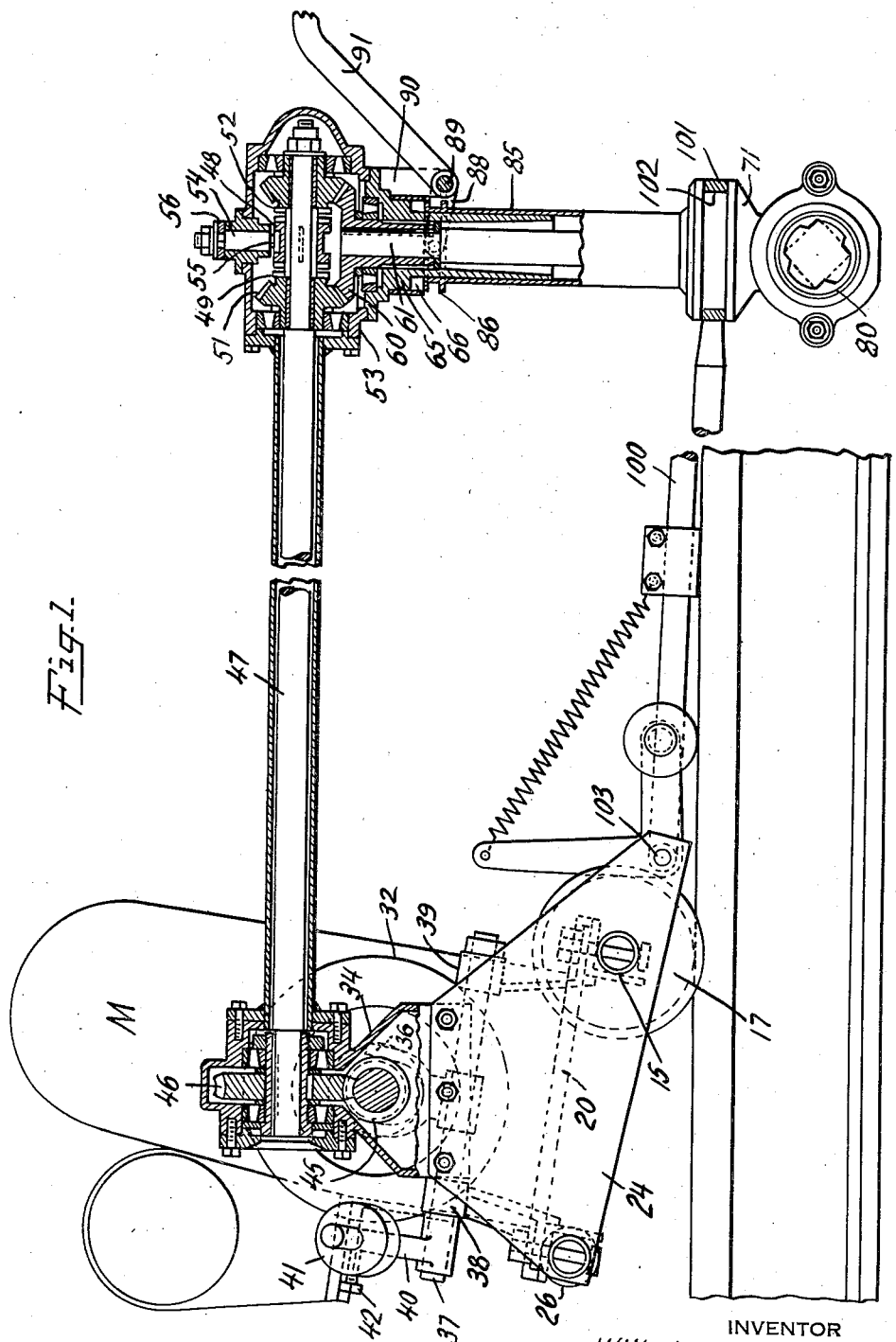

2,137,998

UNITED STATES PATENT OFFICE 2,137,998

DRIVING MECHANISM

Wilhelm B. Bronander, Montclair, N. J.

Application April 17, 1936, Serial No. 74,959

1 Claim. (Cl. 81—57)

This invention relates to driving mechanism or driving transmitting mechanism.

The driving mechanism has been particularly developed in connection with machines for use on railway tracks for screwing or "running" nuts on the bolts or for loosening and unscrewing nuts from bolts used to connect fish plates to each other and to the rails.

It has been found that many railroad accidents have been due to improper tension on the fish plate bolts. If the bolts are too tight expansion of the connections or side sway on the rails will cause them to break and if the bolts are too loose the fish plates are not firmly held in position and the rails therefore are not held securely in place.

Furthermore, if the nuts are rusted in place or are "frozen" to the bolts they must first be loosened before they can be adjusted to the proper tension. This loosening of the frozen nuts requires an initial extra driving effort or torque over and above that required for running the nuts on the bolts to the desired or predetermined extent.

With the above problems in mind, the salient object of this invention is to provide driving transmitting means or driving connections so constructed and arranged as to give a temporary excess or extra driving torque available for loosening frozen nuts and furthermore, means that will be automatically rendered ineffective to transmit the drive upon predetermined torque conditions, as when the nuts are screwed or run on the bolts to the desired extent.

Further objects of the invention will appear from the following specification taken in connection with the drawings, which form a part of this application, and in which Fig. 1 is an elevational view partly in section showing driving mechanism constructed in accordance with the invention;

Fig. 2 is a vertical sectional elevation taken through the wrench sockets and tool head; and Fig. 3 is an elevational view taken at right angles to Fig. 1 showing the friction driving connection and control therefor.

This application is a division of application Serial No. 692,381, filed October 6, 1933, and is being filed for the purpose of covering the friction drive control for the machine covered as a whole in said application.

The invention briefly described consists of drive transmitting means for driving a wrench socket including friction driving members normally held in operative driving position by a predetermined pressure. This pressure is obtained by means of a lever and the amount of pressure can be controlled by an adjustable weight on the lever. The friction drive and control therefor are so incorporated in the driving connections and are so located relative to the wrench socket that when the wrench is used to loosen a frozen nut the friction driving members will be forced into driving engagement with each other by a pressure exceeding the normal pressure secured through the weight and lever, thus providing initial "kick" or extra driving effort or torque which is available for loosening the frozen nut.

During the normal driving operation in running on the nut the nut will be screwed on the bolt until a predetermined tightness or tension has been obtained whereupon the driving connections will slip and will be no longer effective to transmit the drive. However, the driving members will be at all times maintained in driving relation to each other and will not be thrown out or kicked out of operative driving relation.

Further details of the invention will appear from the following description.

In the particular embodiment of the invention illustrated in the drawings, the apparatus or machine is mounted on an axle 15 having flanged wheels 16 and 17 at one end thereof and a cylindrical roller, not shown, at the other end thereof.

A motor M, such as a gasolene engine, is mounted on a bed plate 20 carried by frame members mounted on the axle. The driving connections are carried by a frame comprising members 23 and 24 mounted on the axle 15, a roller 26 being mounted between the members 23 and 24 and being disposed at the rear end thereof.

The motor M drives an engine shaft 30 on the outer end of which is mounted a disk 31 disposed in engagement with a disk 32 carried by a shaft 33 mounted in a casing 34 which in turn is mounted on the frame formed by the frame members 23 and 24. The disk 31 is carried by or formed on a sleeve 35 which is slidably mounted on the engine shaft 30 and is urged in a direction toward the disk 32 by means of a yoke 36 which engages a grooved collar on the sleeve 35 and is carried by a spindle 37 mounted in brackets 38 and 39. The brackets are secured to the frame which supports the motor M.

The yoke 36 is actuated by a lever arm 40 which, as shown in Fig. 1, is secured to the spindle 37. The arm 40 has adjustably mounted thereon a weight 41 which is secured in adjusted position by a set screw 42. It will be evident that the lever arm 40 and the yoke 36 form in effect a bell crank lever and that the pressure between the disks 31 and 32 will be regulated by the force exerted by the lever 40 and weight 41. The adjustment of the weight will determine the driving effort available under normal driving conditions between the disks 31 and 32 and will thus determine the tension to be placed on the bolt or, in other words, how tightly the nuts will be screwed on the bolts as they are run thereon.

This friction drive control is very important and, as will be hereinafter described, provides in addition to the normal driving torque an initial extra kick or torque effort to loosen or free frozen nuts.

The shaft 33 in the form of the invention illustrated has mounted thereon a worm 45 which meshes with a worm gear 46 keyed to a transmission shaft 47. The front end of the transmission shaft has splined thereon a clutch member 48 which is slidably mounted and is adapted to engage complementary clutch members 49 or 50 carried by or formed on bevel gears 51, 52.

The parts mentioned in the preceding paragraph are enclosed in a casing 53 and a stud or spindle 54 is rotatably mounted in the top of the casing and has formed on the lower end thereof an offset pin 55 which engages the clutch member 48. A handle 56 is secured to the upper end of the spindle or stud 54 and by rotating the stud by means of the handle the clutch member 48 can be moved to engage one or the other of the complementary clutch members 49, 50.

The gears 51 and 52 mesh with a bevel gear 60 which is mounted on the upper end of a vertical shaft 61 which extends downwardly through the casing 53. The direction of drive of the gear 60 and shaft 61 will depend on which of the gears 51 or 52 is driven by the clutch member 48.

The casing 53 has extending downwardly therefrom a sleeve 65 having depending teeth 66, the sleeve and teeth surrounding the shaft 61 and being spaced therefrom. The shaft 61 has connected to the lower end thereof a clutch member 67 which is adapted to engage a complementary clutch member 68 carried by the upper end of a hollow shaft 69. The shaft 69 receives the lower end 70 of the shaft 61.

The shaft 69 is carried by a tool head casing 71 and has formed on or secured to the lower end thereof a bevel gear 72. This gear meshes with a gear 73 carried by a stub shaft 74 and has a sleeve 75 extending therefrom in a direction opposite to the shaft 74. A nut socket 76 is carried by the sleeve 75 and has a dove-tail connection 77 therewith, the socket being held in position on the sleeve by means of a sleeve 78 which surrounds the sleeve 75 and the inner portion of the socket 76. The sleeve 78 is secured in place by means of a flanged ring 79 which is bolted in position on the casing 71.

It will be obvious that as the shaft 61 is driven in the manner hereinbefore described that the shaft 69 will also be driven when the clutch members 67 and 68 are engaged and thus the gears 72 and 73 will rotate the nut socket 76.

In addition to the nut socket 76 carried by the casing 71 a second nut socket 80 is also carried by the casing and is driven at a reduced rate of rotation and in a direction opposite to the direction of the shaft 74 and socket 76. This is accomplished by a gearing comprising a pinion gear 81 connected to one end of the shaft 74, idler gears 82 meshing with and driven by the pinion 81 and a ring gear 83 which surrounds and meshes with the idler gears and is in turn connected to the socket 80. The socket 80 and ring gear are held in position by a collar 84 which is bolted to the casing or to the flanged ring 79.

Since the apparatus above described is used to tighten or unscrew nuts on the fish plate bolts both inside and outside of the rails means is provided for so adjusting the tool head or casing 71 as to provide for proper engagement between the sockets carried thereby and the nuts. In order to accomplish this the tool head or casing 71 is mounted for angular adjustment around the axis of the shaft 61. A tubular casing 85 is secured to the casing 71 and extends upwardly therefrom around the shaft 61. The upper end of the tubular casing 85 has formed on or secured thereto a collar 86 having teeth 87 adapted to engage the teeth 66 formed on the sleeve 65. The collar 86 is engaged by arms 88 carried by a spindle 89 mounted in a bracket 90 secured to the casing 53. A lever arm 91 is also secured to the spindle 89 and by moving the lever arm up or down the arms 88 will also be moved, thus moving the tubular casing 85 in a vertical direction. When the tool head casing or socket casing is to be angularly adjusted the arm 91 is raised, thus freeing the teeth 87 from the teeth 66. This movement will also free the clutch members 67 and 68 from driving engagement with each other and the tubular casing 85 and parts carried thereby can be rotated to the desired position to bring the socket casing at the right angle to the rails to properly engage the nuts. After this position has been reached a downward pressure is exerted on the arm 91, thus moving the teeth 87 and 66 into engagement with each other, and by maintaining pressure on the arm 91 this engagement will be maintained. The movement of the sockets into engagement with the nuts can be controlled by handles 92 and 93 and the other hand of the operator can exert a pressure on the arm 91 and maintain the parts in their adjusted position.

The teeth of the clutch members 67 and 68 and the teeth 66 and 87 are so proportioned as to length that the clutch member teeth 67 and 68 will move out of engagement before the teeth 66 and 87 are freed and vice versa.

The casing 71 is further held and steadied during the use of the apparatus by means of a link 100 which is secured at its front end to a ring 101 which is mounted in a groove 102 formed in the casing 71 and thus the casing can swivel. The other end of the link 100 is pivoted on a stud 103 which extends between the front end portions of the side frames 23 and 24.

*Operation*

The casing 85 is first so adjusted relative to the casing 53 as to properly engage the nuts to be operated on. This is done by a manipulation of the arm 91 in the manner hereinbefore described. The clutch member 48 is so set as to drive the shaft 61 in the desired direction and the power derived from the engine M will then cause the nut to be screwed or unscrewed by the engagement with one of the sockets 76 or 80.

The driving mechanism above described when used for running on nuts will provide a predetermined driving torque which will tighten the nuts to such an extent as to place the desired and proper tension on the bolts. This tension can be regulated by the adjustment of the weight 41 on the lever 40. However, when the apparatus is used to loosen rusted or frozen nuts the resistance encountered by the wrench will tend to pull down on the front end of the apparatus and raise the rear end of the structure disposed in the rear of the axle 15. This upward movement of the rear end of the mechanism will be resisted by the weight thereof and by the weight 41 on the lever 40 which will cause the lever to be swung or to tend to swing in a clockwise direction viewing Fig. 3 thus placing an extra or added pressure on the disk 33 forcing this disk into engagement with the disk 32 with a greater than normal pressure. This added pressure provides the required initial kick or extra driving torque which is necessary to loosen the frozen nut.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claim.

What I claim is:

In combination, an axle, supporting wheels therefor, a frame pivoted on the axle, a motor, motor shaft and drive transmitting gearing including friction disks and means including a lever and adjustable weight thereon for pressing said disks into driving contact with each other, said parts being disposed in the rear of the axle on said frame, a transmission shaft connected to the gearing and extending forwardly to a point in front of the axle, a tool head on the front of said shaft and operatively connected thereto, said tool head having a wrench socket, and driving connections for driving said wrench in either direction.

WILHELM B. BRONANDER.